(12) United States Patent
Lin

(10) Patent No.: US 7,376,222 B2
(45) Date of Patent: May 20, 2008

(54) PHONE APPLIANCE WITH DISPLAY SCREEN AND METHODS OF USING THE SAME

(76) Inventor: Ching-Yi Lin, P.O. Box 1185, New York, NY (US) 10021

( * ) Notice: Subject to any disclaimer, the term of this patent is extended or adjusted under 35 U.S.C. 154(b) by 0 days.

(21) Appl. No.: 10/909,680

(22) Filed: Aug. 2, 2004

(65) Prior Publication Data

US 2005/0063525 A1 Mar. 24, 2005

Related U.S. Application Data

(63) Continuation of application No. 09/896,593, filed on Jun. 29, 2001, now abandoned.

(60) Provisional application No. 60/214,913, filed on Jun. 29, 2000.

(51) Int. Cl.
*H04M 1/00* (2006.01)
(52) U.S. Cl. .............................. 379/93.17; 379/93.01; 379/93.23
(58) Field of Classification Search ............. 379/93.01, 379/93.02, 93.03, 93.06, 93.07, 93.08, 93.15, 379/93.17, 93.23, 93.24, 93.25, 114.01, 114.03; 370/352–356, 386, 493–495
See application file for complete search history.

(56) References Cited

U.S. PATENT DOCUMENTS

| 6,552,825 B1 * | 4/2003 | Doi et al. ................... 358/404 |
| 6,643,283 B2 * | 11/2003 | Derks .......................... 370/352 |
| 6,744,759 B1 * | 6/2004 | Sidhu et al. ................. 370/356 |
| 7,076,434 B1 * | 7/2006 | Newnam et al. ............... 705/1 |
| 2001/0040621 A1 * | 11/2001 | Gerszberg et al. ....... 348/14.01 |

FOREIGN PATENT DOCUMENTS

JP 408263409 A * 10/1966

* cited by examiner

*Primary Examiner*—Melur Ramakrishnaiah
(74) *Attorney, Agent, or Firm*—Carter, DeLuca, Farrell & Schmidt, LLP

(57) ABSTRACT

A phone appliance and method of use are provided where the phone appliance can be used to make VoIP communications calls. In a preferred embodiment, the phone appliance includes an RF connection for connecting to a computer or other computing device for facilitating the placement of the VoIP communications calls. The phone appliance further includes a display or portal for depicting advertisements provided by various advertisers. The advertisements provided can be used to defray all or part of the cost associated with making VoIP communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the phone appliance, such as being able to download e-mail messages stored within or received by the computer.

27 Claims, 4 Drawing Sheets

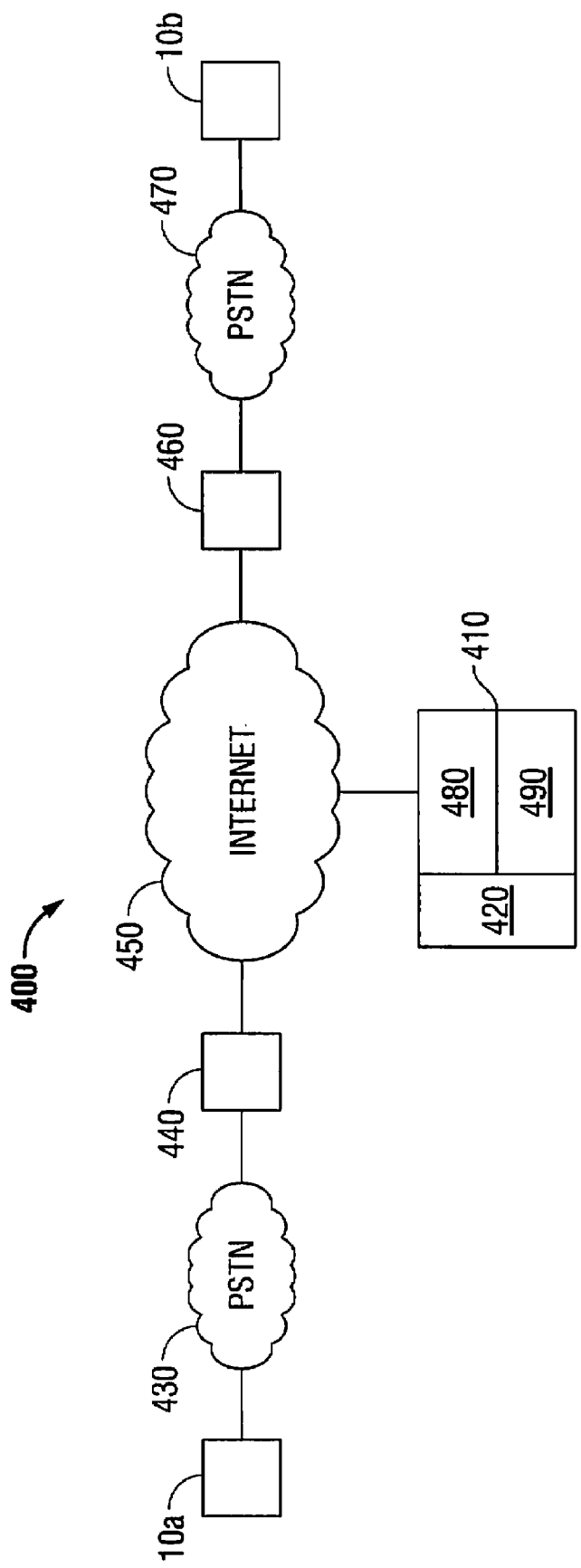

PHONE APPLIANCE WITH DISPLAY SCREEN AND METHODS OF USING THE SAME

PRORITY

The present application is a continuation of application Ser. No. 09/896,593, filed on Jun. 29, 2001, now abandoned which claims priority to a United States Provisional Application filed on Jun. 29, 2000 and having U.S. Provisional Application Ser. No. 60/214,913, the contents of which are incorporated herein by reference.

BACKGROUND OF THE INVENTION

1. Technical Field

The present disclosure relates generally to a communications device and, more particularly, to a phone appliance, which transmit voice over data network, which will henceforth in this patent, vernacularly, be referred to as an IP Phone or phone appliance including a display screen for displaying advertisements and other information downloaded from a network. The present disclosure also relates to a method of using a phone appliance having a display screen and, more particularly, to a method of using a phone appliance having a display screen for providing unique benefits to a user, e.g., defraying part or all of the cost of phone service.

2. Background of Related Art

Sending voice over data network, such as Voice-over-Internet protocol (VoIP) communications, is quickly emerging as a viable means for communicating. For example, communications over data networks can entail a calling party using a standard telephone to place a call by connecting to the public switched telephone network (PSTN). The call is routed by the PSTN via the Internet by an originating gateway. After being routed through the Internet, the call exits the Internet and is received by a destination gateway. At the destination gateway, the call is routed through the PSTN to a standard telephone of a called party.

The main advantage of communications over data network is the ability to make long distance telephone calls at a fraction of the cost of traditional circuit-based calls. For example, the calling party may reside in Brooklyn, N.Y. and the called party may reside in London, England. Nonetheless, the calling party is billed for the VoIP telephone call to London, England at a lower rate than tradition circuit-based calls, since much of the voice is transmitted through data network such as the Internet. It is, however, predicted that this main advantage of VoIP communications will soon be reduced. Regulations and laws are being proposed to charge VoIP providers access charges, which comprise a percentage of the cost of providing traditional long distance. Therefore, it is foreseen that once these regulations and laws are passed, consumers will use VoIP communications less frequently than once imagined.

Further, communications over data networks, such as VoIP, may be used for foregoing long distance telephone charges. For example, VoIP communications have not evolved significantly to provide for performing other services while making a VoIP telephone call, such as integrating voice with data, allowing consumers to view advertisements, video clips, etc. and for replying to the same, and making VoIP more seamless for consumers to use.

Additionally, in order to make communications over data network a more lucrative tool for VoIP or a related communications companies, business methods need to be implemented where the communications companies receive a fee for various actions performed by the calling and called parties while on a data communications call Therefore, a need exists for preventing a decrease in VoIP or its liked data communications due to charging consumers who make such communication calls at long distance telephone calling rates.

A need also exists for making the use of a PC or other computing device together with a phone seamless when both devices are used to make VoIP communications calls.

A need also exists for enabling consumers to perform other services while making the VoIP communication call and for charging a VoIP communications company or other service provider company, or the consumers, with a fee for the services performed by the consumers. Such fees are likely to be used to defray the cost associated with making VoIP communications calls or other data communications calls at long distance telephone calling rates.

Further, a need exists for a phone appliance having a portal for displaying data transmitted over the VoIP data network.

SUMMARY

In accordance with the present invention, a phone appliance and method of use are provided where the phone appliance can be used to make data communications calls such as VoIP. In a preferred embodiment, the phone appliance includes an RF connection for connecting to a computer or other computing device for facilitating the placement of the VoIP or another data communications type calls. The phone appliance further includes a display or portal for depicting advertisements or information provided by various advertisers or vendors. The advertisements provided can be used to defray all or part of the cost associated with making VoIP or a relate data communications calls. The portal can also be used to communicate with businesses for ordering products, such as ordering a pizza, and to perform various services, such as purchasing stocks. In an exemplary system, the phone appliance is used to transmit to a control center information related to the user of the phone appliance, such as interests and buying habits, and queries for receiving additional information for various advertised products and services. The control center transmits the queries to the appropriate vendors for providing the user with additional information. Other functions and features are provided to the phone appliance, such as being able to download e-mail messages stored within or received by the computer.

BRIEF DESCRIPTION OF THE DRAWINGS

Various preferred embodiments of the presently disclosed phone appliance are described herein with reference to the drawings, wherein:

FIG. 4 is a block diagram of a system according to the present invention.

DETAILED DESCRIPTION OF PREFERRED EMBODIMENTS

Figure 1:
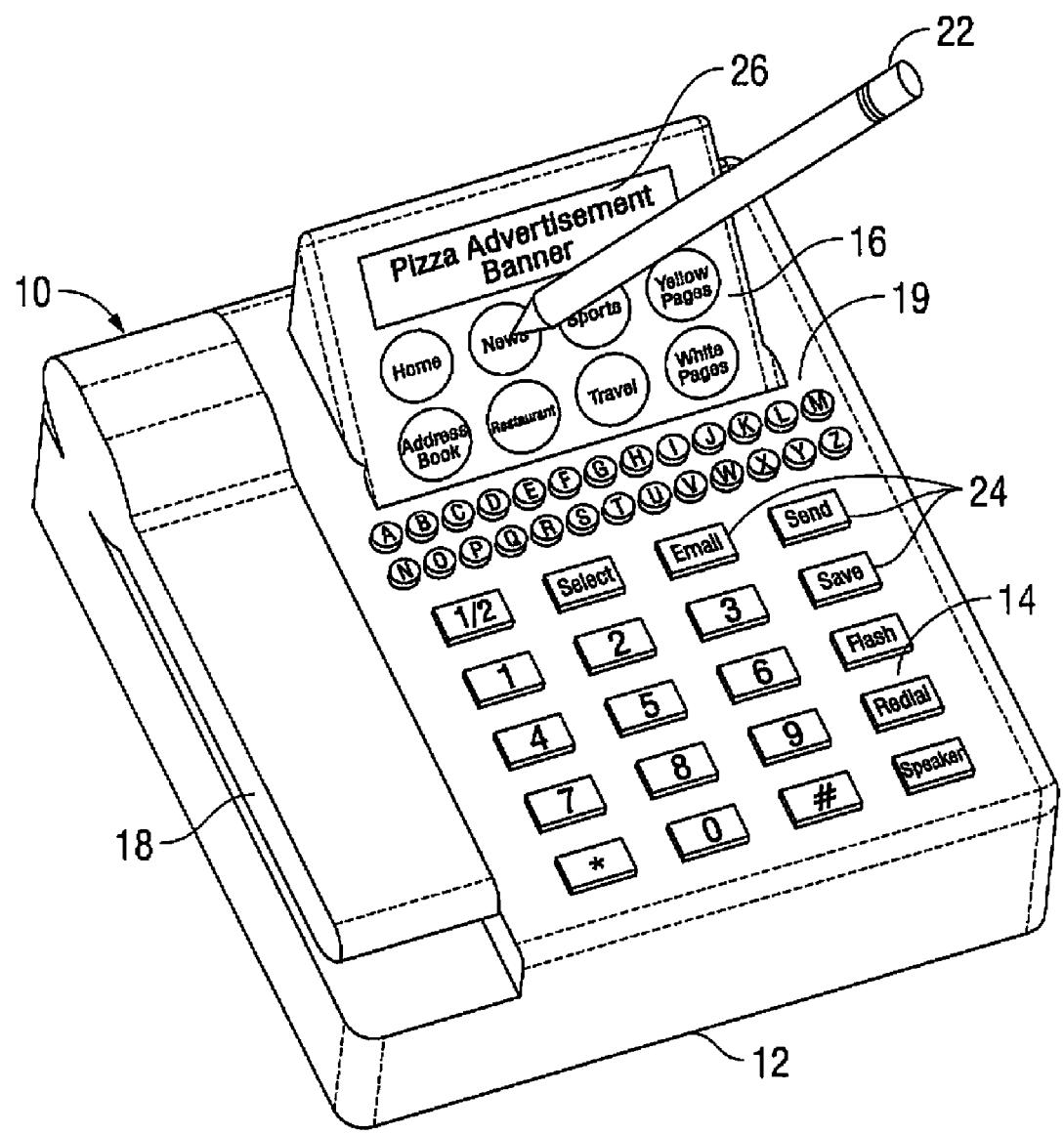
FIG. 1 is a perspective view of the presently disclosed phone appliance.

Preferred embodiments of the presently disclosed phone appliance and methods of use will now be described herein with reference to the attached drawings, in which like reference numerals designate identical or corresponding elements in each of the several views.

Figure 2:
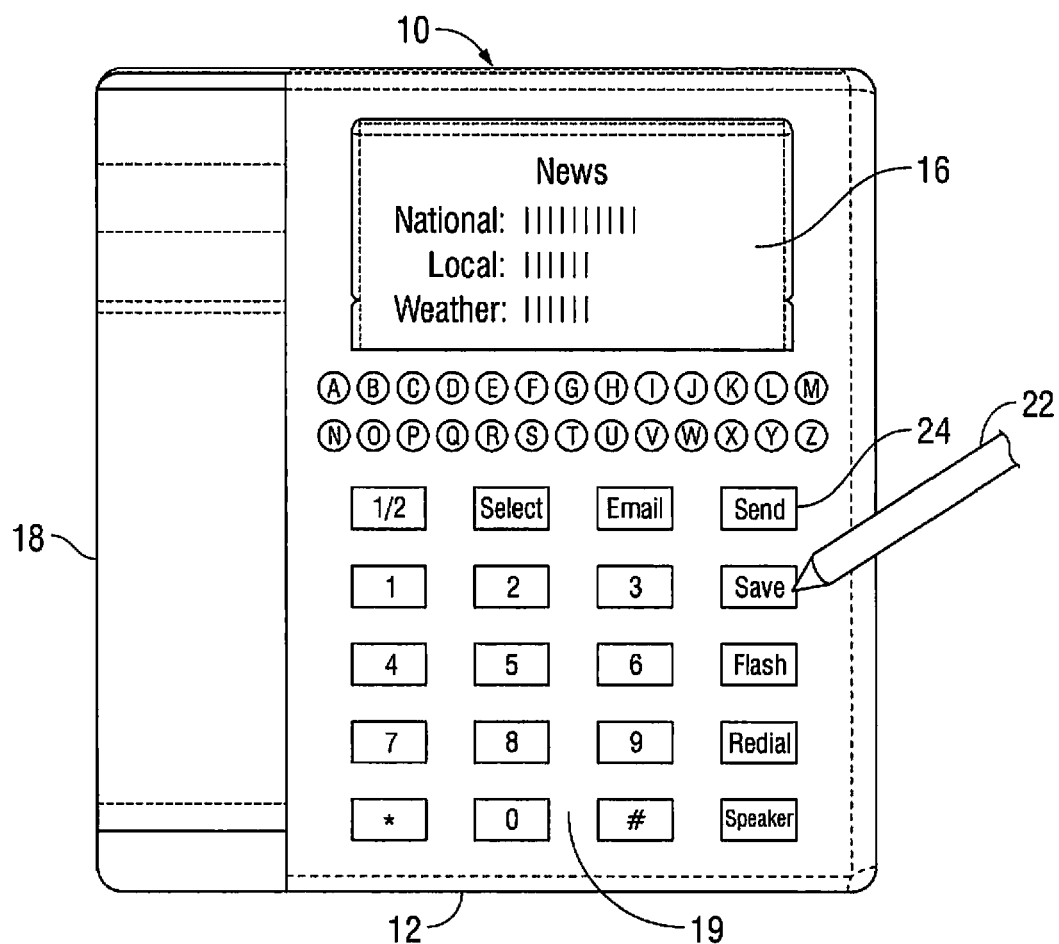
FIG. 2 is a top view of the phone appliance shown in FIG. 1.
Figure 3:
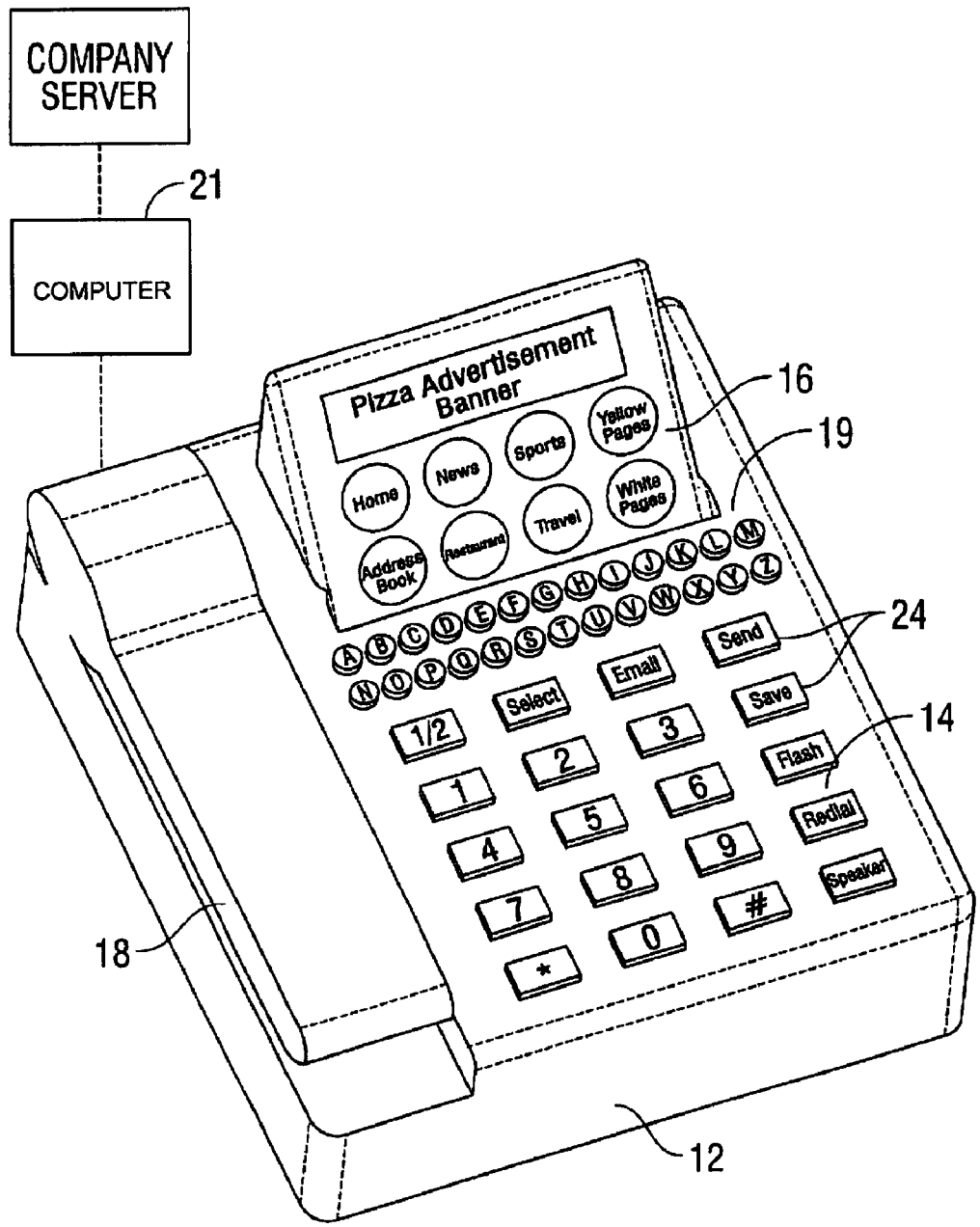
FIG. 3 is a perspective view of the phone appliance shown in FIG. 1 shown schematically interfaced with a personal computer and a company server.

Referring to FIGS. 1-3 below, phone appliance 10 includes a housing 12 having a keyboard 14 and a display screen 16. Display screen 16 is preferably formed from liquid crystal display (LCD). Alternately, other types of display screens may be used, e.g., organic light emitting diodes (OLED). A phone handset 18 is supported on housing 12 in a conventional manner. Handset 18 may be directly connected to the housing 12 via an electrical cord, or alternatively, may be of the cordless type. Although not shown, phone appliance 10 may also include a speaker phone function.

The phone appliance 10 can be adapted to be connected to any computer port to interface phone appliance 10 to a computer 21, but is preferably connected through a universal serial bus (USB) port (not shown). Alternatively, phone appliance 10 can include a wireless transceiver, such as a wireless RF transceiver, to wirelessly interface phone appliance 10 to a computer 21 with a matching transceiver.

Voice data, multimedia data, and other data can be transmitted to and from the computer 21 and phone appliance 10 via the USB port or via RF signals. By using a USB port or RF signals to communicate between the phone appliance 10 and the computer 21, VoIP communications or other type of communications can be integrated with the Internet or a data network in a more cost-effective manner than if the computer 21 alone or the phone appliance 10 alone was used for making VoIP communications over a VoIP data network or another voice over data network.

By using a USB port or RF signals to communicate between the phone appliance 10 and the computer 21, the phone appliance 10 can be provided with less computing, processing and/or memory resources, since the computing, processing and/or memory resources of the computer 21 are used, i.e., shared, by the phone appliance 10 through the USB or RF connection for providing VoIP communications or other data-type communications. By using less computing, processing and/or memory resources, the fabrication and retail costs of the phone appliance 10 may be reduced.

For example, the phone appliance 10 may utilize a network browser program, such as Netscape Navigator ™, installed within the computer 21 and the computer's modem for accessing the Internet, thereby, being a cheaper priced phone appliance than a phone appliance that does not communicate via a USB port or RF signals with a computer and must have its own browser program and modem for connecting to the voice over data network. It is a cost-effective to have the phone appliance mimic the computer with services such as e-mail, Internet access and portal features. In such an embodiment, one can use the phone appliance 10 to make VoIP or another data-type communications, or access the Internet, by dialing the called party via the Internet (or other data network) without being "aware" that the call is being placed through the Internet. To the user, the phone appliance 10 is a traditional phone that can be carried anywhere for placing VoIP or other data-type communication calls given the appropriate connections.

It is further provided that the phone appliance 10 includes means for receiving data from the computer 21, such as e-mail, to enable one to access data stored within the computer 21 via the phone appliance 10. Further, the phone appliance 10 can be upgraded with new software by downloading the new software from the data network by the IP phone 10 and/or wirelessly transmit the new software to the IP phone 10 via the RF connection between the computer 21 and the IP phone 10.

Any RF transceiver commercially available from a number of sources, such as Intel (AnyPoint™ Wireless Home Network), can be provided to the phone appliance 10. The computer 21 in turn can access a phone network, such as the PSTN.

The PSTN in turn accesses a data network, such as the Internet. Such access may be obtained a number of ways, for example, via a local area network, a dial up connection, any local loop access technology that calls for modems such as a digital subscriber line (DSL) or a cable modem connection. The data network is used via the computer 21 to transport voice data point-to-point, or partially in conjunction with the PSTN and pathways, to complete the call and carry on a VoIP communication. The data network also transports data to and from the IP phone keyboard 14 and display 16 via the computer 21 for purposes described herein below.

Keyboard 14 includes an alpha-numeric keypad 19 which can be used to place a phone call or access and/or retrieve information from a computer 21 and display the information on display screen 16. For example, display screen 16 is optionally a touch screen which allows the user to access display information such as the yellow pages, addresses, news, stock quotes, etc. by touching a pointer 22 to the corresponding area on display screen 16. A touch pad or mouse ball may also be incorporated in lieu of a touch screen in a known manner to control a pointer on the display screen 16 to select the desired display information.

The phone appliance 10 may also include additional features to improve upon the quality and speed of phone service and/or the security of the transmission system. For example, phone appliance 10 may include a digital signal processor to improve the sound quality of the voice transmission or hardware vocoders and communication circuitry to transmit alpha-numeric as well as voice data. The phone appliance 10 may also include means for converting analog to digital, generating sets or packets of digital data from voice signals and alpha-numeric inputs and means for compressing the digital data to increase the speed and efficiency of the data transmission, including providing better sound quality than a PC sound card. An encryption encoder and a decryption decoder or equivalent software may also be provided in phone appliance 10 to facilitate secure transmission of voice and alpha-numeric information. The phone appliance 10 may further include a video camera or a port for connecting a video camera to the phone appliance 10. The video camera can be used for transmitting a video image of a user of the phone appliance 10, e.g., as in a video-phone. The phone appliance 10 may further include GSM capability.

The phone appliance 10 also includes software and hardware for performing gateway functions that provide two-way, real time communication interfaces between an IP-based or data network and a telephony network including mapping, translation, signaling and control of the media and signaling gateway. By being able to perform gateway functions, the phone appliance 10 prevents the bottleneck effect, since the phone appliance 10 includes in essence the originating gateway. Further, the gateway functions also helps reduce the cost of providing voice-over-data communications networks, since some call origination cost(s) may be eliminated.

In a preferred embodiment, display screen 16 is used to display advertisements or information downloaded from the data network via the computer 21 (FIG. 3). The advertisements or information can be used, for example, to defray the consumer cost associated with phone service. More specifically, advertisements and other information can be downloaded from the data network via the computer 21 onto display screen 16 of IP phone 10 while a VoIP or related data type communication call is in progress. It is also contemplated to download advertisements and other information using the IP phone 10 when there is no VoIP or voice communication call in progress.

In exchange for displaying the advertisements, the advertiser or user can defray part or all of the cost of the phone and/or service. The advertiser or user can pay a flat or variable fee to the long distance provider and/or any other service provider to defray the cost of the phone and/or service. Alternately, each advertisement or information may include an identifier, which is recognized by software or hardware in phone appliance 10 or computer 21. Thereafter, the advertiser or vendor will be charged a specified fee for the advertising or information by a service provider.

For example, with reference to FIG. 4, a service provider of a system 400 maintains a control center 410 having a database 420 storing a plurality of advertisements or information therein. Upon the establishment of a VoIP or another data type communication call between a calling party using a first phone appliance 10*a* and a called party using a second phone appliance 10 bata packets are transmitted along with the voice packets from one or both of the IP phones 10*a*, 10*b*. For example, the voice packets are transmitted to the opposite party via a first PSTN 430, an originating gateway 440, the Internet 450, a destination or terminating gateway 460, and a second PSTN 470, as known in the art.

On the other hand, the data packets are transmitted to the control center 410 via the first PSTN 430, the originating gateway 440, and the Internet 450, and/or the destination gateway 460, the second PSTN 470, and the Internet 450. The data packets contain a head-end for being correctly routed to the control center 410 and identifying information. The identifying information is used by the control center 410 to determine from which phone appliance 10 the data packets originated from. Once the originating phone appliance 10 is determined by the service provider, the service provider can target specific advertisements, video clips, messages, etc. stored within the database 420 to the user of the originating phone appliance 10 during the duration of the VoIP or data typed communication call. The specific advertisements, video clips, messages, etc. could be related to interests, products of interest, and other promotional information (which may be, for example, of interest to the user) to the user of the originating IP phone appliance 10 as determined by the service provider and/or user.

The service provider is able to determine the advertisements, multimedia clips, or other information to target to specific users by correlating the identifying information as received by the data packets with a user database 480. The user database 480 stores information pertaining to various users of phones appliance 10 throughout the system 400. The information stored relates to various characteristics of each user, such as age, buying habits, interests, etc. The information may be acquired by the service provider by periodically transmitting a questionnaire to the users of phones appliance 10 via the system hardware. The questionnaires are provided with routing data packets so that they reach the users of phone appliance 10. The users of phones appliance 10 answer the questionnaires and can transmit the completed questionnaires back to the control center 410.

Once each questionnaire is transmitted back to the control center 410, it is provided with data packets, as noted above, for being correctly routed to the control center 410.

The system 400 may provide incentives for the users of IP phones 10 to answer the questionnaires and transmit them back to the control center 410. Such incentives could be, for example, defrayal of long distance charges when making VoIP communication calls, entrance into periodic sweepstakes, free product samples, etc.

The service provider can also acquire the information by noting which advertisements sparked an interest to respective users. The system 400 notes when a user of a phone appliance 10 clicks on or selects an advertisement or information for obtaining additional information about the company, service, product, etc. being advertised or displayed. Accordingly, it is noted that any interaction with the display or portal 16 of the phone appliance 10 by a particular user, may cause a data packet to be transmitted to the control center 410.

The data packet is appended with identifying information for identifying the particular phone appliance 10 which caused the generation and transmission of the data packet. The data packet is also provided with routing information for correctly routing the data packet to the control center 410 or other location. The generation and transmission of data packets with identifying and routing information is performed by data processing and transmission hardware and/or software, as known in the art, provided within the phone appliance 10 and/or computer 21.

It is contemplated that when the user selects an advertisement for obtaining additional information, the control center 410 sends a request to the particular vendor with the user's contact information. It is further contemplated to provide the handset of the phone appliance 10 with a button which a user can press while communicating over the VoIP data network, or other network, for indicating a response to an advertisement or other data displayed by the display screen 16.

The service provider processes the data packets received by the users providing responses to the data displayed on the phone appliance 10. The service provider then appends the user database 480 with any pertinent information related to the particular user which was obtained by processing the data packets. The system 400 is thus a VoIP or data-type communications system configured for obtaining information of interest to advertisers, such as companies, institutions, non-profit organizations, etc., while providing incentives or benefits to users for providing such information.

It is provided that the service provider can sell the information acquired of the various users of the system 400 to the advertisers, vendors, marketing companies, etc. for a fee or an exchange of goods or services. It is further provided that the control center 410 is provided with software modules having programmable instructions for being processed by one or more processors of the system 400 for performing the above-described functions and other functions.

It is provided that the control center 410 further includes a billing station 490 for receiving and processing data packets indicating the initiation and termination of VoIP communications as known in the art. Accordingly, the billing station 490 keeps track of billing information. The billing information is then transmitted to a telecommunications company for billing subscribers of the system 400.

With continued reference to FIGS. 2 and 3, phone appliance 10 also may include a plurality of function keys 24.

Function keys 24 can be depressed to perform pre-selected tasks. For example, function keys may be provided to redial the last number dialed, access E-mail from the computer 21, send E-mail, send faxes, call another party, send data to a server, print file, delete a file, retrieve MP-3 files, establishing communication link with a software, etc. The function keys 24 can also be used to respond to advertisements, menus, questions, etc. appearing on the display 16.

For example, the function keys 24, as well as the alpha-numeric keypad 19, can be used to type one's e-mail address within an entry box appearing on the display 16 for transmitting the e-mail address to a vendor or to dial or complete a call to a desired advertiser. It is provided that the responses entered using the function keys 24 and the alpha-numeric keypad 19 are first transmitted to a control center, such as control center 410, operated by the service provider, before being transmitted to the appropriate vendor. The function keys 24 can also be used for transmitting an advertisement displayed to another user or to a certain e-mail address.

In a preferred embodiment, a "record" function key is provided. The record function key may be depressed to record a VoIP conversation. In doing so, the acoustic signals are converted to a corresponding analog signal which in turn is converted to digital data through an analog-to-digital converter. Thereafter, the digital data corresponding to the recorded conversation can be compressed and stored in the computer memory or on disk. Alternately, the service provider may provide a storage warehouse for storing recordings of VoIP conversations, for example, within a memory device located at the control center 410. For a fee, the recorded VoIP conversations can be transmitted to the storage warehouse via the computer 21 or directly for later use.

In another preferred embodiment of phone appliance 10, display screen or portal 16 displays advertisements 26 from local or national service providers or vendors, e.g., local take-out restaurants, etc. By pressing advertisement 26 with pointer 22, a menu or order form will be displayed on screen 16. Thereafter, a send command can be entered to place the order with the local or national service provider or vendor. Software necessary to perform these functions can be dynamically downloaded, via the computer 21, or manually installed by a user via the computer 21, or factory installed into phone 10. Each service provider would be charged a percentage of the sale by a third party vendor for use of the service. Alternately, the third party vendor can be compensated by selling or leasing the software and/or content to the service provider for a fee.

The portal 16 can be further used as an interface with various vendors, such as a brokerage firm, over a VoIP or another data communications network for allowing the user to perform various services, such as directly communicate with the vendors, purchase stocks, etc. It is provided that the communications with the various vendors can be directed through the computer 21 before being transmitted to the various vendors through VoIP or another data communications network or may be directly to VoIP or another data communication network.

It is appreciated that various software modules are provided within the phone appliance 10, the computer 21 or other device for performing the functions described above with respect to the phone appliance 10 and the system 400, such as the phone appliance 10 communicating via the RF connection with the computer 21.

It will be understood that various modifications may be made to the embodiments disclosed herein. For example, a variety of different function keys and touch pad keys may be provided to perform a variety of different tasks not specifically identified here, e.g., grocery shopping. Moreover, phone appliance 10 may include the capability for storing and/or playing music files such as MP3 music files. Therefore, the above description should not be construed as limiting, but merely as exemplification of preferred embodiments. Those skilled in the art will envision other modifications within the scope and spirit of this disclosure.

What is claimed is:

1. A phone appliance for facilitating sending voice-over-data communications, including voice-over-the-Internet protocol (VoIP) data communications, via a voice-over-data network, said phone appliance comprising:
   means for performing gateway functions for interfacing with the voice-over-data network;
   means for establishing a communication link with the voice-over-data network for communicating via the voice-over-data network, including transmitting and receiving VoIP data communications;
   means for periodically receiving from a control center a request for information via the voice-over-data network;
   means for displaying data, including the request for information, received via the voice-over-data network and transmitted to the phone appliance via the established communication link; and
   means for responding to the displayed data, including the request for information, by transmitting a response via the established communication link.

2. The phone appliance according to claim 1, wherein the communication link is a wireless RF communication link to a computer connected to the voice-over-data network.

3. The phone appliance according to claim 1, wherein the means for displaying data is a touch screen display, and wherein the means for responding to data includes a pointer for making contact with the touch screen display.

4. The phone appliance according to claim 1, further comprising means for receiving software via the established communication link.

5. The phone appliance according to claim 1, wherein the means for responding is a plurality of keys.

6. The phone appliance according to claim 1, wherein the means for performing gateway functions performs at least one gateway function.

7. The phone appliance according to claim 1, further comprising means for converting analog to digital, generating packets of data from voice signals and means for compressing the data.

8. The phone appliance according to claim 1, further comprising encryption/decryption means for facilitating secure transmission of data.

9. The phone appliance according to claim 1, wherein the data displayed by the mean for displaying is selected from the group consisting of an advertisement, multimedia, a video clip, an electronic message, a questionnaire, an order form, and information from at least one vendor.

10. The phone appliance according to claim 1, further comprising means for recording audio signals transmitted over the voice-over-data network and means for storing said recorded audio signals.

11. A voice-over-data network system for providing voice communications over a data communications network to at least one user, including voice-over-the-Internet protocol (VoIP) data communications, the system comprising:
   at least one phone appliance having means for performing gateway functions for interfacing with the data communications network, means for establishing a communication link with the data communications network for communicating via the data communications network, including transmitting and receiving VoIP data communications, means for displaying data received via the data communications network and transmitted to the at least one phone appliance via the established communication link, and means for responding to data displayed by the means for displaying via the established communication link; and a control center having means for receiving and providing data from and to the at least one phone appliance via the data communications network, the control center further having means for analyzing data generated by the means for responding and received via the data communications network, means for providing at least one incentive to a user of the at least one phone appliance in response to said user transmitting requested information to said control center, and means for maintaining at least one database correlating the analyzed data with users of the plurality of phone appliances.

12. The system according to claim 11, wherein the data displayed by the mean for displaying is selected from the group consisting of an advertisement, multimedia, a video clip, an electronic message, a questionnaire, an order form, and information from at least one vendor.

13. The system according to claim 11, wherein the means for maintaining at least one database includes maintaining a database correlating at least buying habits of the at least one user of the at least one phone appliance.

14. The system according to claim 11, wherein the at least one incentive includes for a service operator and/or a user affiliated with the control center to defray part or all of the cost associated with the voice over the data network communications.

15. The system according to claim 11, wherein the communication link is a wireless RF communication link to a computer connected to the data communications network.

16. The system according to claim 11, wherein the means for displaying data is a touch screen display, and wherein the means for responding to data includes a pointer for making contact with the touch screen display.

17. The system according to claim 11, further comprising means for receiving software via the established communication link.

18. The system according to claim 11, wherein the means for responding includes at least one key.

19. The system according to claim 11, wherein the means for performing gateway functions performs at least one gateway function.

20. The system according to claim 11, wherein the at least one phone appliance includes means for converting analog to digital, generating packets of data from voice signals and means for compressing the data.

21. The system according to claim 11, further comprising means for recording audio signals transmitted over the voice-over-data network and means for storing said recorded audio signals.

22. The system according to claim 11, further comprising means for keeping track of billing information corresponding to the at least one user.

23. A method for facilitating voice over a data network communications, comprising the steps of:

providing a voice-over-the-data network phone;

performing at least one gateway function for establishing a communication link with a voice-over-a-data communications network using the voice-over-the-data network phone for communicating via the voice-over-the-data communications network, including transmitting and receiving voice-over-the-Internet protocol (VoIP) data communications;

periodically receiving by the voice-over-the-data network phone a request for information from a control center via the voice-over-data communications network;

displaying data, including the request for information, received via the voice-over-the-data communications network on a display of the voice-over-the-data network phone; and responding to the displayed data, including the request for information, by transmitting a response via the established communication link.

24. The method according to claim 23, wherein the step of establishing a communication link further comprises the step of establishing a wireless RF communication link to a computer connected to the voice-over-the data communications network.

25. The method according to claim 23, wherein the step of displaying data further comprises the step of displaying data on a touch screen display of the voice-over-the-data network phone.

26. The method according to claim 23, wherein the data displayed is selected from the group consisting of an advertisement, multimedia, a video clip, an electronic message, a questionnaire, an order form, and information from at least one vendor.

27. The method according to claim 23, further comprising the step of receiving software via the established communication link.

* * * * *